United States Patent [19]

Owen et al.

[11] 4,101,939

[45] Jul. 18, 1978

[54] VIDEO SYNCHRONIZER WITH VELOCITY COMPENSATION

[75] Inventors: David Peter Owen, Newbury; Barry Donald Ruberry Miles, Thatcham, both of England

[73] Assignee: Quantel Limited, England

[21] Appl. No.: 769,615

[22] Filed: Feb. 17, 1977

[30] Foreign Application Priority Data

Feb. 19, 1976 [GB] United Kingdom ............... 6588/76

[51] Int. Cl.² .............................................. H04N 5/78
[52] U.S. Cl. ........................................................ 360/36
[58] Field of Search .................... 358/148, 8, 264; 360/37, 51, 32, 36; 178/69.1

[56] References Cited

U.S. PATENT DOCUMENTS 3,971,063  7/1976  Michael et al. .................. 358/8

Primary Examiner—Robert L. Richardson
Attorney, Agent, or Firm—Dowell and Dowell

[57] ABSTRACT

A velocity compensator arrangement for a synchronizer which includes an input oscillator, main store and output oscillator in which the controlling voltage of the input oscillator is sampled during one line and compared with the controlling voltage for the next line. Any voltage difference is converted into digital form and this is stored in a digital store until the corresponding line is read out from the main store. The phase of the output oscillator is shifted in dependence on the voltage difference held in the store. This store may comprise part of the main store or be an independent store.

12 Claims, 4 Drawing Figures

4,101,939

VIDEO SYNCHRONIZER WITH VELOCITY COMPENSATION

BACKGROUND TO THE INVENTION

The invention relates to a video synchronizer having a velocity compensator therein for correcting velocity errors on incoming video signals derived from video tape recorders (VTR).

Velocity compensation is well known in digital time base correctors. An improved method of time base correction is disclosed in British patent application (U.S. Pat. No. 3,995,112) which describes the concept of 'look-ahead' velocity compensation for time base correctors that effectively monitors the velocity error from the tape recorder that is occurring while the line of information is being written in to one of the time base corrector (TBC) line stores. The output from the velocity compensation circuit then modifies the output velocity correspondingly.

Such a TBC look-ahead velocity compensator requires a small number of individual analogue stores corresponding to the number of lines being stored in the TBC. Now if this method was extended to cover a framestore for example with perhaps 485 or even 585 lines the number of individual stores would become immense and would result in extreme difficulty in physically realising the system.

OBJECT OF THE INVENTION

An object of the invention is to provide velocity compensation suitable for a large scale storage system as for example in a framestore.

SUMMARY OF THE INVENTION

According to the invention there is provided a video synchroniser comprising:
a first analogue-to-digital converter for converting an incoming analogue video signal to digital form;
a video store for receiving successive lines of video information in digital form from said converter;
a digital-to-analogue converter for converting a digital output signal from said store into analogue form;
control means for writing-in and reading-out the digital information into and from said store;
a triggered voltage controlled input oscillator for determining the rate of conversion of said analogue signal to digital form and the rate of writing into said store;
an output oscillator for controlling the rate of reading out of the digital information from said store and the rate of conversion into analogue form;
sampling means for sampling the input oscillator controlling voltage during one line;
measuring means for detecting any voltage difference in the controlling voltage during successive lines;
a second analogue to digital converter for converting the analogue voltage difference detected by said measuring means into digital form;
digital storage means for retaining the digital voltage from said converter means;
phase shifter means for shifting the phase of the output oscillator in dependance on the voltage difference held by said digital storage means.

BRIEF DESCRIPTION OF THE DRAWINGS

The invention will now be described by way of example with reference to the accompanying drawings in which.

DESCRIPTION OF PREFERRED EMBODIMENT

Figure 1:
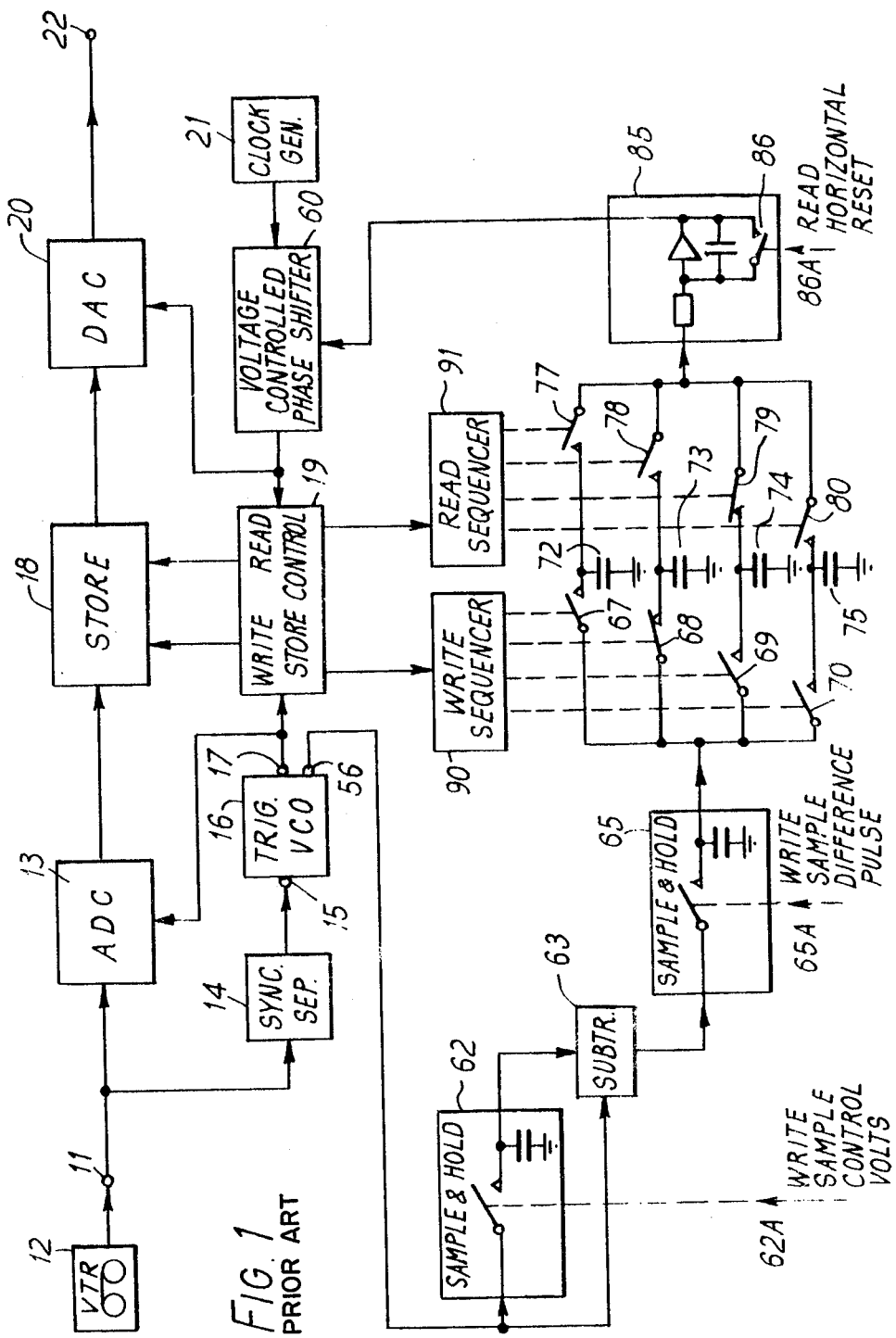
FIG. 1 shows the 'look ahead' velocity compensator disclosed in British Patent Application No. 3207/76.

The digital time base corrector 10 of FIG. 1 (disclosed in co-pending British Patent Application No. 3207/76) comprises an input 11 connected both to an analogue-to-digital converter (ADC) 13 and to a sync separator 14.

The digital output from converter 13 (in 8 bit parallel form) is connected to a store 18 which has its output connected to a digital-to-analogue converter (DAC) 20. The output from sync separator 14 is fed to input 15 of a triggered oscillator 16, the output 17 of which is used to provide clocking of the write-in facility of store control 19 together with clocking of ADC 13. The read-out facility of store control 19 is clocked by means of clock generator 21 which also provides clocking for DAC 20. The time base corrector is provided with an output terminal 22. Input terminal 11 is shown connected to a video tape recorder 12.

The incoming video signal from the VTR includes sync pulse and colour burst information. An output pulse from separator 14 is initiated by the leading edge of the received sync pulse and the start pulse triggers oscillator 16 to produce a burst of pulses. The length of the pulse train is sufficient to cause all the video information in one active line period to be converted by the ADC and stored before the oscillator output ceases awaiting arrival of the next start pulse from separator 14.

Typically the line length is approximately 64 μs, and the frequency of oscillators 16 and 21 is about three times (colour burst) sub-carrier frequency.

The input oscillator 16 effects an alteration of its frequency on a line to line basis by means of a controlling voltage derived internally. Triggered oscillators are described in detail in British patent applications Nos. 11793/74 and 11794/74 and U.S. Pat. Nos. 3,971,063 and 3,978,519. The length of the train of sampling clock pulses is varied in sympathy with the off-tape line period by changing the frequency of the clock pulses from line to line. Whilst the oscillation frequency may vary from line to line, the number of pulses will remain constant for each line as determined by a counter within the triggered oscillator. The oscillator pulses are made available at output 17. The controlling voltage is made available at output 56. This controlling voltage is dependent on the time between the stopping of the oscillator at the end of a line and triggering at the start of the next line.

The output of the clock generator 21 is connected via a voltage controlled phase shifter 60 to the store control 19 and DAC 20.

The voltage for controlling the phase shifter 60 is derived from an additional circuit arrangement which includes a sample and hold circuit 62 which receives the frequency control voltage from output 56 of VCO 16. The voltage from output 56 is also applied to a subtractor 63 which measures the difference between the voltage from voltage controlled oscillator (VCO) 16 (say at line $n$) and that at the sample output of hold circuit (line $n$-1). The voltage error measured by the subtractor 63 (at the start of line n) is applied to a further sample and hold circuit 65 which samples and holds this error voltage (during line n). The output from hold circuit 65 is applied to several storage paths (in this example four, which is dependent on the line storage capacity of digital store 18). Each path is provided with an input switch 67, 68, 69 or 70, a storage capacitor 72, 73, 74 or 75 respectively, and an output switch 77, 78, 79 or 80 respectively. Input switches 67–70 are controlled by write sequencer 90. Output switches 77–80 are controlled by read sequencer 91. Write sequencer 90 ensures that the voltage applied to a particular capacitor corresponds to the same line being read into the store 18. Read sequencer 91 ensures that the correct capacitor is connected to the output corresponding to the line being read out from the store. The voltage from the connected capacitor 72, 73, 74 or 75 is applied to ramp generator (integrator) 85 of known construction which includes a reset switch 86 to ensure that the ramp generated starts from a fixed reference point. The voltage produced by generator 85 is applied to the voltage controlled phase shifter 60, to phase shift the signal from clock generator 21 in dependence on this voltage level. Voltage controlled phase shifters are well known (e.g. monostables). Since any line of video is stored for at least one line time in the store then by using this circuit arrangement it is possible to compensate for VTR timing errors not only at the input to the store 18 but also at the output therefrom by changing the phase of the oscillations received from output clocking generator 21 to compensate for errors measured for that line by subtractor 63. Sequencers 90, 91 could comprise four stage ring counters to sequence in turn switches 67–70 and 77–80.

The output voltage from the VCO is sampled and then passed through the subtractor 63 where the difference is measured in relation to the next voltage level from the VCO, and after further sampling is stored for further use in (say) capacitor 72. Thus each of the capacitors 72–75 will be used to store the output from sampler 65 every fourth line and this level is passed to ramp generator 85 at the appropriate time to correct for error via the phase shifter 60 as described above. The write sample control waveform 62A may for example be derived from the counter contained in the VCO 16. The write sample difference pulse 65A may also be derived from the counter but is staggered relative to 62A. Read reset pulses 86A may be derived from the output of the clock generator 21.

Although the oscillator start pulse for the triggered VCO 16 in this instance is derived from the leading edge of the synchronizing pulse alone, it is also possible as described in the aforementioned co-pending British Patent Applications (and U.S. Patents) for the snyc pulse information to be combined with information contained in the colour sub-carrier burst to improve the timing stability of the oscillator start point.

The system of FIG. 1 whilst being suitable for storing a few lines of information cannot be extended to store a large quantity of information (e.g. a whole field or frame) without the necessity of vast numbers of analogue stores for storing the velocity compensation information (i.e. one for each line of the field or frame).

Figure 2:
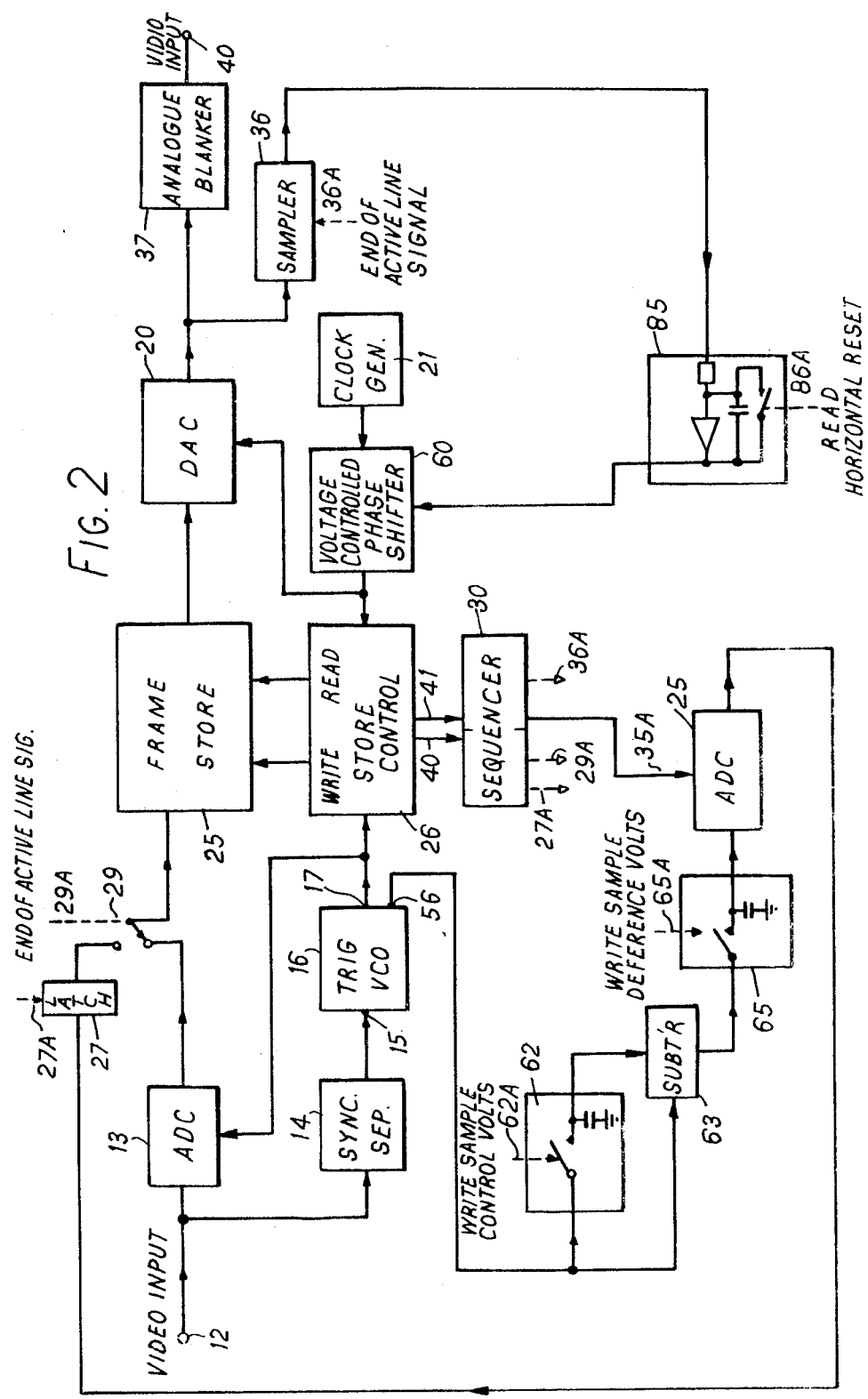
FIG. 2 shows an embodiment of the synchronizer of the present invention.

To overcome this difficulty, an embodiment of the invention shown in FIG. 2 uses the concept of digital storage of the velocity compensation information which allows up to a whole frame to be stored.

The line store of FIG. 1 has been replaced by a frame store 25 suitable for use with the synchroniser to provide a frame store synchroniser. Ideally this frame store is of the type disclosed in British Patent Application 6585/76 which is based on random access memories and use can be made of the fact that the capacity of the memory is very slightly larger than that required for storing picture information. Ideally the velocity compensation data should be stored for each line of the frame. In practice only those lines which carry picture information on test lines need to be stored i.e. on the 525 line system, approximately 500 lines must be stored, in the 625 line system approximately 585 lines must be stored.

The look-ahead velocity compensation signed can then be added to the end of the video line in question so that on reading out that line for display the correct compensation is automatically available to the output circuits for that line. The store control 26 is expanded to provide control for this store.

Although the frame store and control must be capable of handling several hundred lines of video information, the store control 26 and store 25 function in basically the same way as the store control 19 and store 18 in that the write signals from oscillator 16 and read signals from oscillator 21 (via phase shifter 60) are used to initiate and control write and read cycles in the store. The store control includes address counters for addressing the various memory addresses within the frame store for a read or write cycle and timing control for producing timing signals for addressing the memory elements at the correct point in time. If the store used is the frame store disclosed in British patent application No. 6585/76 then this is constructed from known 64 × 64 bit memory chips (i.e. 4096 by 1 bit) which bit locations are accessed by entering row and column address information from the store control as an 18 bit address derived from picture point counters. Timing within control 26 is provided using tapped delay lines. As the 4096 random access memory chip is dynamic, a refresh cycle must also be effected to retain the stored data. Refresh address counters are therefore included. For example, a store using 16 cards each containing 32 RAM chips would provide a framestore of 256 × 512 words 8 bits wide to allow 512 video lines each of 512 picture points to be stored.

The voltage derived from output 56 of oscillator 16 is sampled in sample-hold circuit 62 and subtracted in subtractor 63 to produce the error voltage as before. This error voltage is then sampled in sample hold unit 65. This analogue voltage held in sampler 65 is converted into an 8 bit digital word by the analogue to digital converter 35 which converter is controlled by a initiating signal derived from a sequencer 30.

The digital signal representing the error voltage is fed to a latch 27.

The incoming video signal converted in ADC 13 is fed to a switch 29. The switch 29 normally connects the ADC to the frame store 2 to allow picture information to be stored. At the end of each line when picture information is finished the switch 29 changes over under the action of a signal derived from the sequencer 30. This connects latch 27 to the store so that compensation data contained therein is then fed to the store. This happens on a line by line basis so that each velocity compensation signal remains with the TV line with which it is associated. Latch 27 is also sequenced by sequencer 30.

Figure 3:
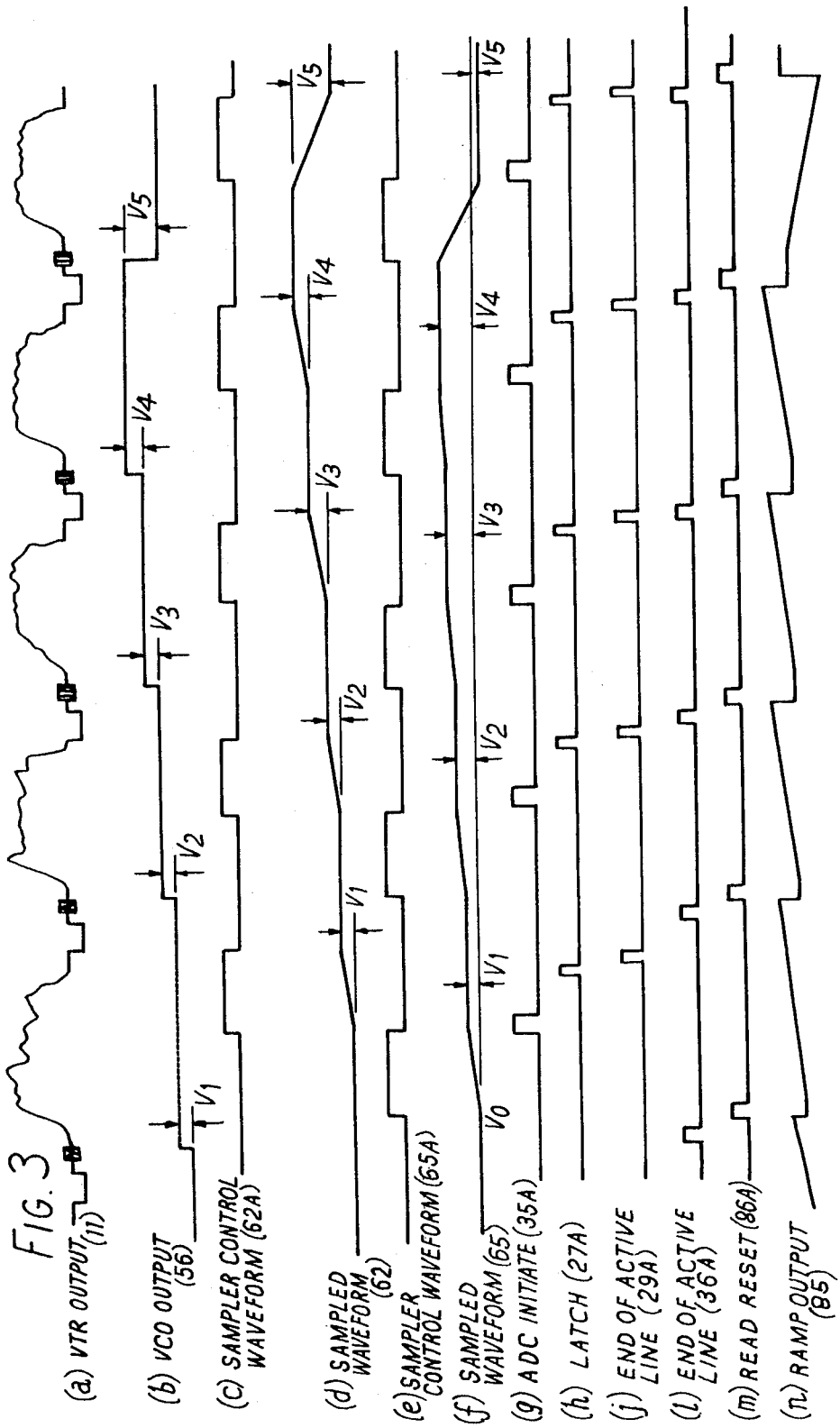
FIG. 3 shows waveforms produced within the system of FIG. 2.

When the digital information is read out from the store, it is reconverted into analogue form by DAC 20 and a sampler 36 samples this analogue output at the end of each active line so that the signal sampled corresponds to the velocity error signal previously received by the ADC 35. Analogue blanker 37 is provided after DAC 20 to ensure that the compensation signal contained on the analogue output of DAC 20 does not appear at the video output 40. The waveforms produced in the FIG. 2 arrangement are shown in FIG. 3.

As described above, the write sample control pulse 62A and write sample difference pulse 65A may be derived from the counter within input oscillator 16 and the read horizontal reset pulse may be derived from output oscillator 21.

The sequencer 30 receives write and read clock pulses from oscillators 16 and 21 (via control 26) and at inputs 40 and 41 respectively. The sequencer can be considered as being constructed in two halves (i.e. write and read sides). Each half may comprise two binary dividers and decoders, one used as a frame divider and the other as a line divider. Such divider/decoders are well known in the art.

The area of the sequencer which is concerned with the look ahead velocity compensation ADC 35 is the line sequencer on the write side of block 30. This binary divider/decoder network divides down clock pulses from the triggered VCO to provide decode pulses at various times during the television line. The pulse required by the ADC 35 is one to initiate the conversion process and this pulse must occur after the write sample difference volts switch 65 has settled down. This occurs approximately 20µS after the sync pulse which gives the ADC approximately 30µS to complete the conversion before latch 27 is clocked. The data at the output of latch 27 must be valid at the end of the active line so that it may be clocked into the main store 25 during the front porch interval.

Whilst the ADC 35 requires an initiating pulse, the ADC can be provided with an internal clock pulse generator so does not require external sampling clocks. The converter may comprise a single I.C. chip (e.g. type AD7570 Analog Devices). The latching signal 27A is generated by sequencer 30 as is end of line signal 29A actuating switch 29. The read side of sequencer 30 provides end of line pulse 36A for sampler 36.

In an alternative arrangement to FIG. 2, two separate digital to analogue converters could be provided one converting the video information and the other the compensation information.

Although the arrangement of FIG. 2 has been described as having the velocity compensation information added to the end of the line to which it is associated in practice this information is likely to be read out from the store too late for the output circuits to modify the frequency for that line. Therefore it is preferable that the store address system is arranged such that on switching switch 29 to connect ADC 13 the appropriate line address counters are decremented by two so that the velocity compensation information is two lines ahead of the video to which it refers. In this way the output circuits have ample time to operate on this information prior to actually receiving the appropriate video line from the store. FIG. 3 shows that the difference information is 2 lines late, therefore if the line address is decremented by 2 during the Velocity Compensation data 'write' process, it will be read out correctly related to the video information.

The ADC 35 could alternatively receive an initiate pulse from oscillator 16 instead of from sequencer 30.

Although the system has been described as relating to a frame store the store could be a field store and although the system allows compensation data for a large number of lines to be stored it could be used for time base correctors (i.e. where only a few lines of storage are required).

Figure 4:
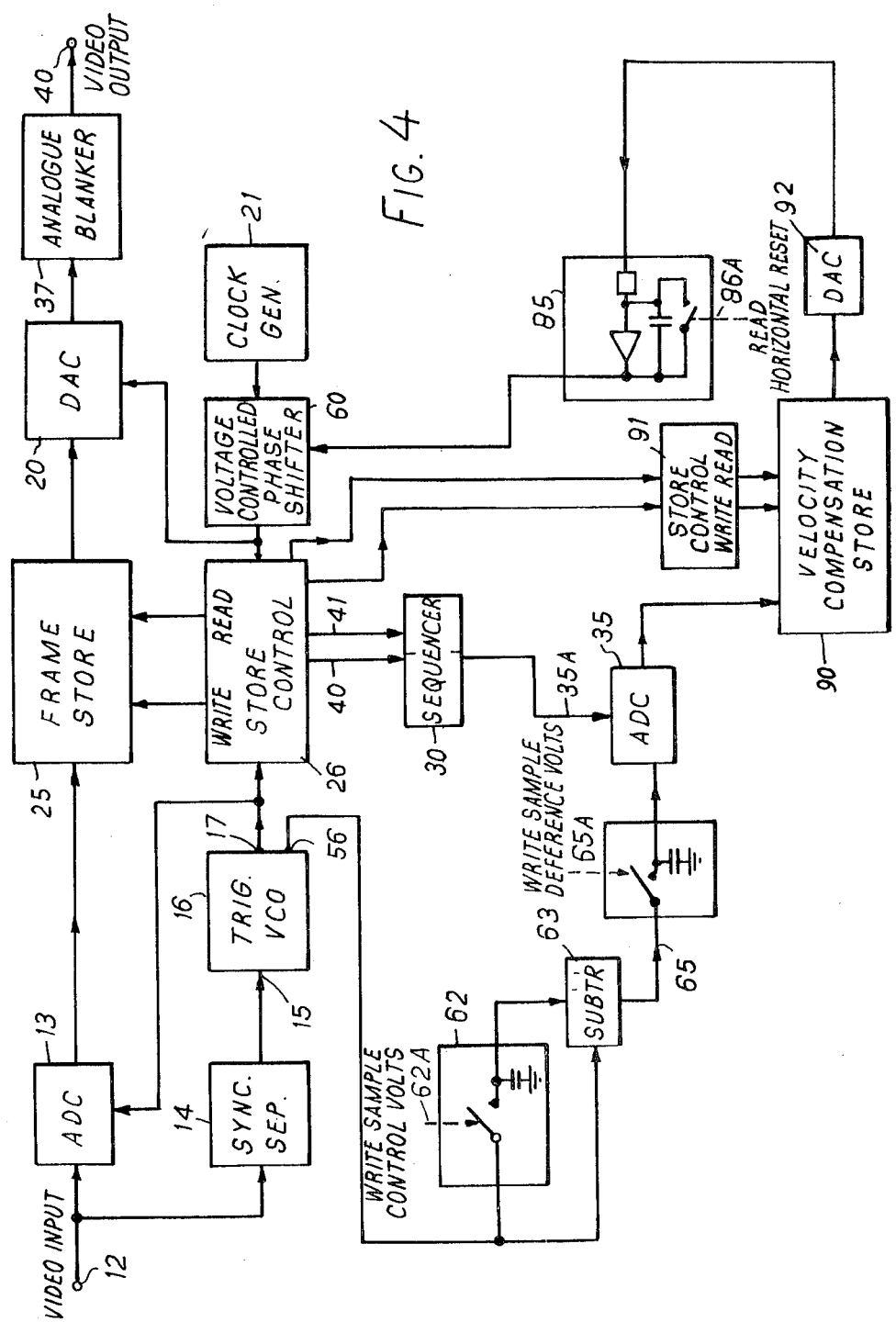
FIG. 4 shows an alternative arrangement to FIG. 2.

Whilst the switches shown in FIG. 2 are simply shown as mechanical switches, in practice these would be constructed from solid state components. Thus the switches in the sample hold circuits could comprise Field Effect transistors (FET). FIG. 4 shows an alternative arrangement to FIG. 2 where the digital compensation data is provided in a separate store 90 to frame store 25 and the data read from the separate store is reconverted by a second digital to analogue converter 92 which has its output connected to ramp generator 85. In this arrangement latch 27, and switch 29 are not required as the video from ADC 13 is applied directly to the frame store. The digital velocity compensation store 90 stores the output of ADC 35 as an 8 bit word for each line of the T.V. frame. A store control 91 is provided to control writing into and reading out from the store 90. Control 91 receives read and write line address information from main store control 26.

We claim:

1. A video synchroniser comprising:
   (a) a first analogue-to-digital converter for converting an incoming analogue video signal to digital form;
   (b) a video store for receiving successive lines of video information in digital form from said converter;
   (c) a digital-to-analogue converter for converting a digital output signal from said store into analogue form;
   (d) control means for writing-in and reading-out the digital information into and from said store;
   (e) a triggered voltage controlled input oscillator for determining the rate of conversion of said analogue signal to digital form and the rate of writing into said store;
   (f) an output oscillator for controlling the rate of reading out of the digital information form said store and the rate of conversion into analogue form;
   (g) sampling means for sampling the input oscillator controlling voltage during one line;
   (h) measuring means for detecting any voltage difference in the controlling voltage during successive lines;
   (i) a second analogue-to-digital converter for converting the analogue voltage difference detected by said measuring means into digital form;
   (j) digital storage means for retaining the digital voltage from said converter means, and
   (k) phase shifter means for shifting the phase of the output oscillator in dependence on the voltage difference held by said digital storage means.

2. A video synchroniser according to claim 1 wherein said digital storage means comprises part of the video store and switching means are provided at the input to the video store to allow the store to alternately receive data from the first and second analogue-to-digital converters respectively.

3. A video synchroniser according to claim 2 wherein latching means are provided to receive the output from the second analogue-to-digital converter to allow the control voltage difference to be added to the video data at the end of each active line.

4. A video synchroniser according to claim 2 wherein the control voltage difference stored in said video store is reconverted into analogue form by said digital-to-analogue converter and output sampling means are provided to retain this analogue voltage to control said phase shifter means.

5. A video synchroniser according to claim 4 wherein analogue blanking means are provided at the output of said digital-to-analogue converter to prevent the converted control voltage appearing at the video output.

6. A video synchroniser according to claim 1 wherein said sampling means comprises a sample and hold circuit for holding the sampled control voltage from said input oscillator during one line.

7. A video synchroniser according to claim 1 wherein said measuring means comprises a subtractor having a first input connected to receive the control voltage from said input oscillator and a second input for receiving the held control voltage from said sampling means for the preceding line to provide a voltage output corresponding to the difference in voltage between the successive lines and wherein second sampling means are provided to hold the detected voltage difference for conversion by said second analogue to digital converter means.

8. A video synchroniser according to claim 3 wherein sequencing means are provided driven by said control means to effect sequencing of said switching and latching means.

9. A video synchroniser according to claim 1, wherein the voltage from said digital storage means is applied to said phase shifter means via a ramp generator.

10. A video synchroniser according to claim 1, wherein said video store comprises a video frame store.

11. A video synchroniser according to claim 1, wherein said digital store means comprises a separate store to said video store and a second digital to analogue converter is provided to convert the digital store output into analogue form to control said phase shifter means.

12. A video synchroniser comprising:

(a) a first analogue-to-digital converter for converting an incoming analogue video signal to digital form;
(b) a video store for receiving successive lines of video information in digital form from said converter;
(c) a digital-to-analogue converter for converting a digital output signal from said store into analogue form;
(d) control means for writing-in and reading-out the digital information into and from said store;
(e) a triggered voltage controlled input oscillator for determining the rate of conversion of said analogue signal to digital form and the rate of writing into said store;
(f) an output oscillator for controlling the rate of reading out of the digital information from said store and the rate of conversion into analogue form;
(g) sampling means for sampling the input oscillator controlling voltage during one line;
(h) measuring means for detecting any voltage difference in the controlling voltage during successive lines;
(i) a second analogue-to-digital converter for converting the analogue voltage difference detected by said measuring means into digital form;
(j) digital storage means for retaining the digital voltage from said converter means;
(k) phase shifter means for shifting the phase of the output oscillator in dependence on the voltage difference held by said digital storage means; and wherein said measuring means comprises a subtractor having a first input connected to receive the control voltage from said input oscillator and a second input for receiving the held control voltage from said sampling means for the preceding line to provide a voltage output corresponding to the difference in voltage between the successive lines and wherein second sampling means are provided to hold the detected voltage difference for conversion by said second analogue to digital converter means.

* * * * *